United States Patent [19]

Nomura et al.

[11] Patent Number: 4,577,719

[45] Date of Patent: Mar. 25, 1986

[54] MOTORCYCLE FUEL SYSTEM WITH FLOW FROM A MAIN TANK THROUGH A LOWER AUXILIARY TANK TO ITS ENGINE

[75] Inventors: Kazuhiko Nomura; Hisashi Kazuta; Hiroshi Kimura, all of Iwata, Japan

[73] Assignee: Yamaha Hatsudoki Kabushiki Kaisha, Iwata, Japan

[21] Appl. No.: 680,745

[22] Filed: Dec. 12, 1984

Related U.S. Application Data

[60] Division of Ser. No. 393,542, Jun. 30, 1982, abandoned, which is a continuation of Ser. No. 162,910, Jun. 25, 1980, abandoned.

[30] Foreign Application Priority Data

Jun. 29, 1979 [JP] Japan ............................ 54-83110
May 16, 1980 [JP] Japan ............................ 55-64803
May 16, 1980 [JP] Japan ............................ 55-64804

[51] Int. Cl.⁴ .......................................... B60K 15/00
[52] U.S. Cl. .................................. 180/219; 280/5 A
[58] Field of Search .......... 180/219; 280/5 A, 289 R, 280/289 A; 297/193, 195

[56] References Cited

U.S. PATENT DOCUMENTS

| | | | |
|---|---|---|---|
| 2,093,912 | 9/1937 | Hayes et al. | 297/195 X |
| 3,771,827 | 11/1973 | Winfree | 297/195 X |
| 3,779,597 | 12/1973 | Uchida | 297/195 X |
| 3,913,974 | 10/1975 | Bowen | 297/195 |
| 3,927,727 | 12/1975 | Hanagan | 280/289 X |
| 3,937,484 | 2/1976 | Morioka et al. | 180/33 R |
| 4,095,820 | 6/1978 | Hanagan | 297/195 X |
| 4,171,731 | 10/1979 | Hilber | 280/289 R X |
| 4,311,261 | 1/1982 | Anderson et al. | 280/5 A X |
| 4,396,084 | 8/1983 | Yoshimura et al. | 280/5 A X |
| 4,413,700 | 11/1983 | Shiratsuchi | 297/193 X |
| 4,469,190 | 9/1984 | Yamaguchi | 180/219 |
| 4,484,651 | 11/1984 | Hattori et al. | 280/5 A X |

FOREIGN PATENT DOCUMENTS

48-14965 4/1973 Japan.

OTHER PUBLICATIONS

"Official HONDA Shop Manual", V45 Sabre–VF750S, Magna–VF750C, (1982), 4 pages, Honda Motor Co., Ltd., Service Publications Office.

*Primary Examiner*—Joseph F. Peters, Jr.
*Assistant Examiner*—Mitchell J. Hill
*Attorney, Agent, or Firm*—Donald D. Mon

[57] ABSTRACT

In a motorcycle having a main frame, a seat support on the frame, and a seat mounted to the seat support. The seat support is at least partially separable from the main frame so as to provide ready access to stored items or for maintenance and repair of motorcycle elements beneath the seat. The seat support is made separable by separable fasteners, or by hinges or pivot pins. The seat support can also serve as the mount for a rear fender. It can be made in a monocoque configuration for improved rigidity, and even for storage such as for a fuel tank.

3 Claims, 23 Drawing Figures

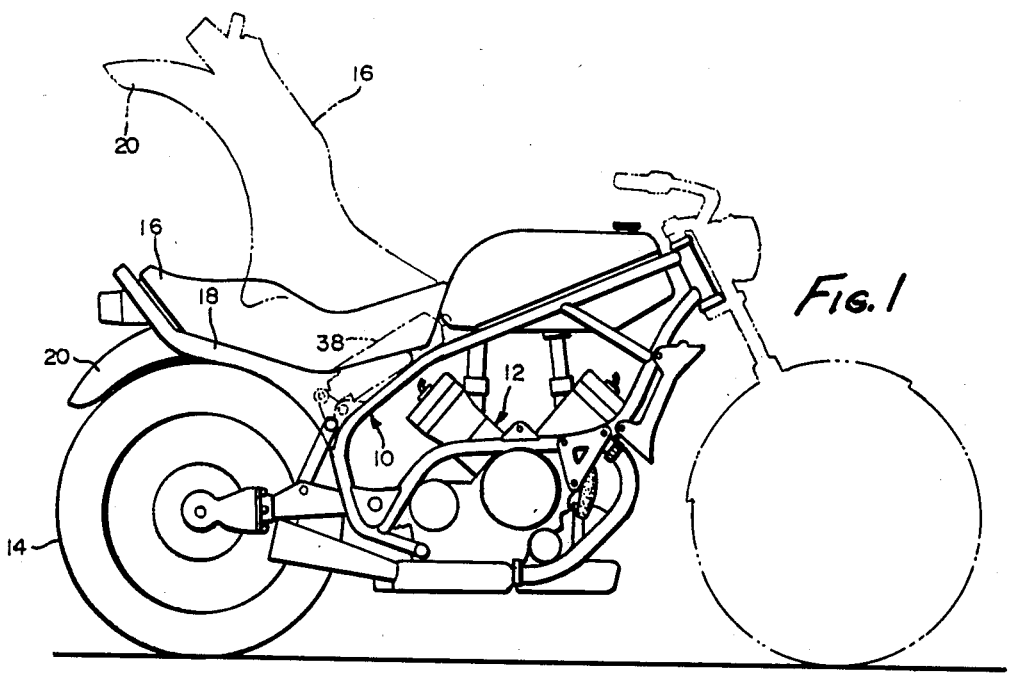
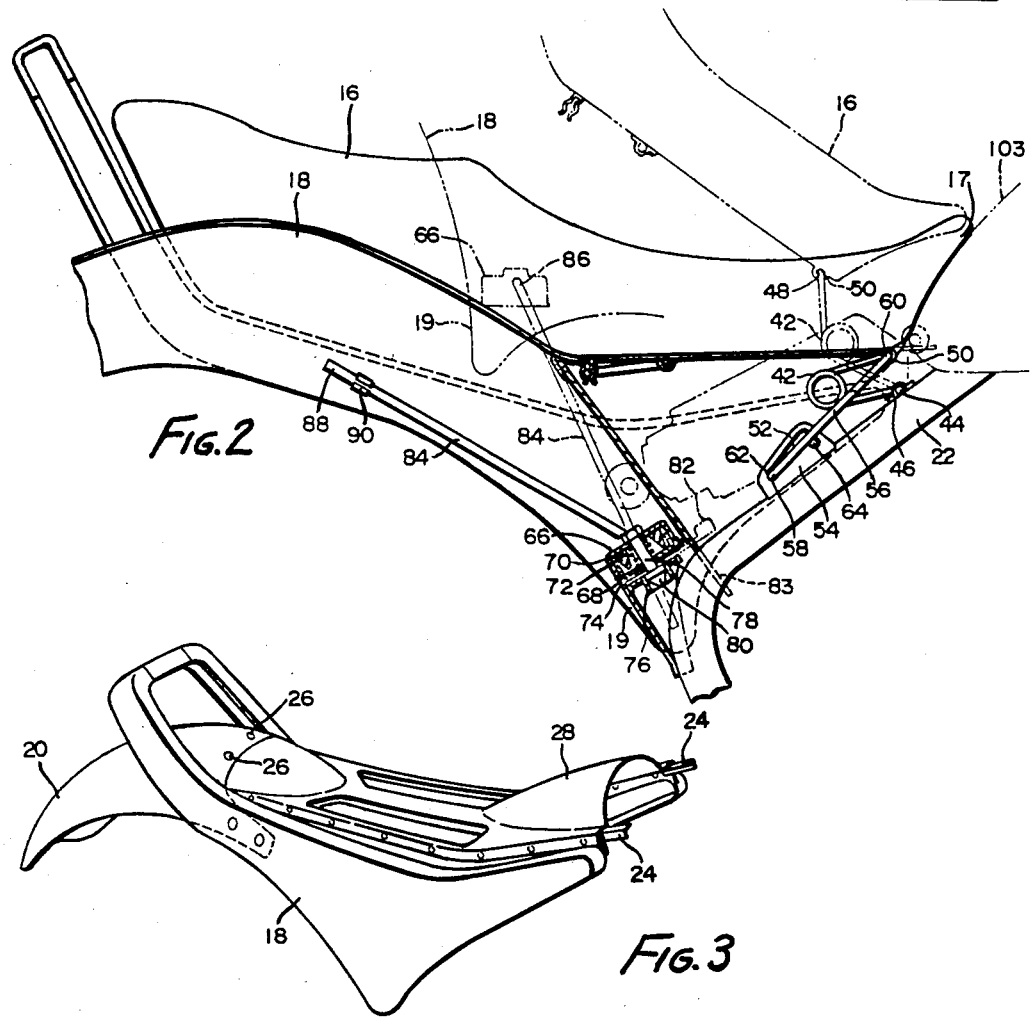

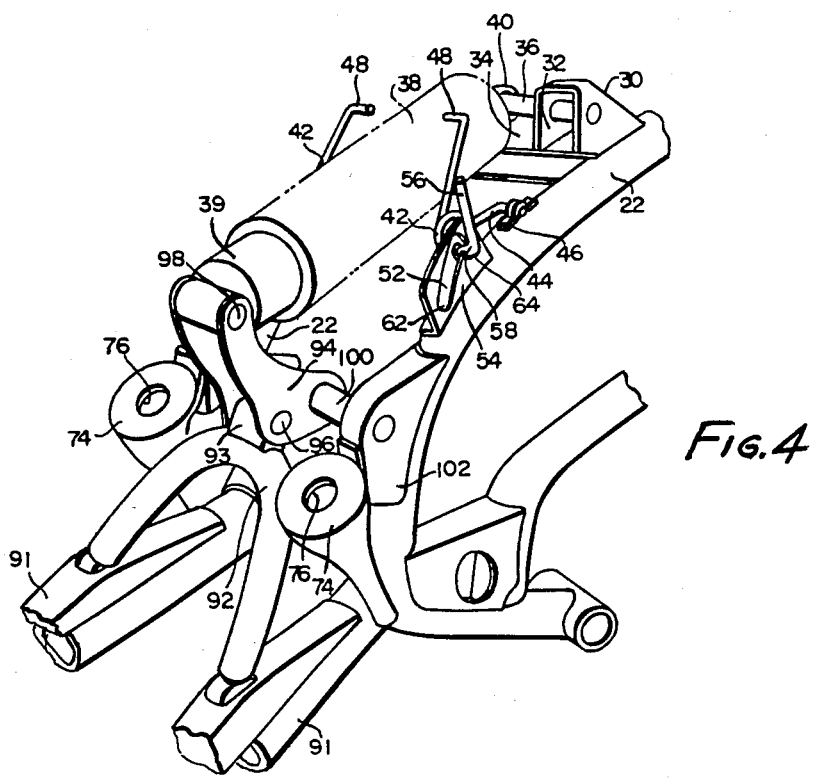
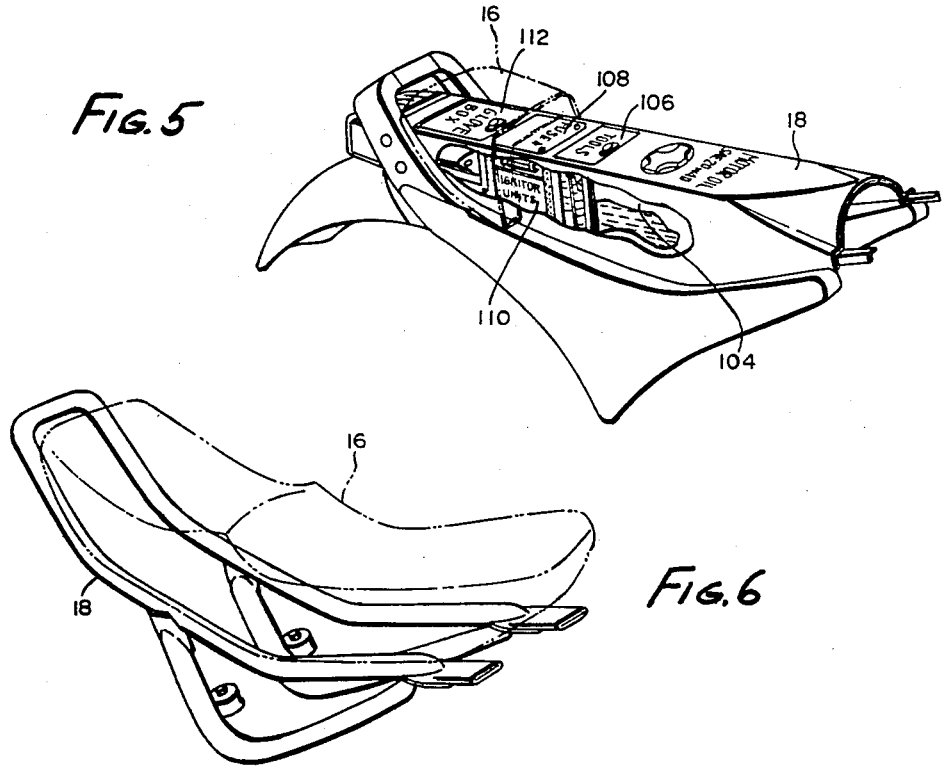

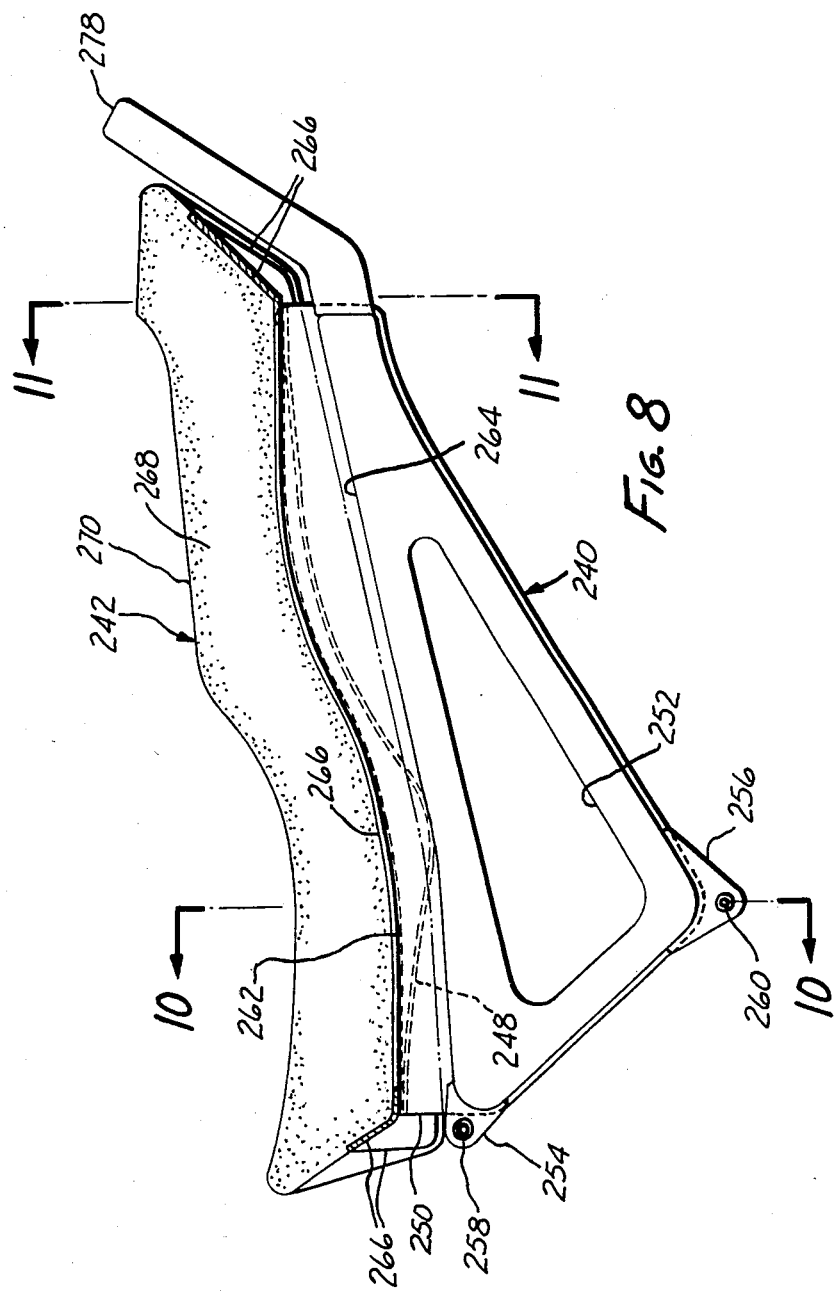

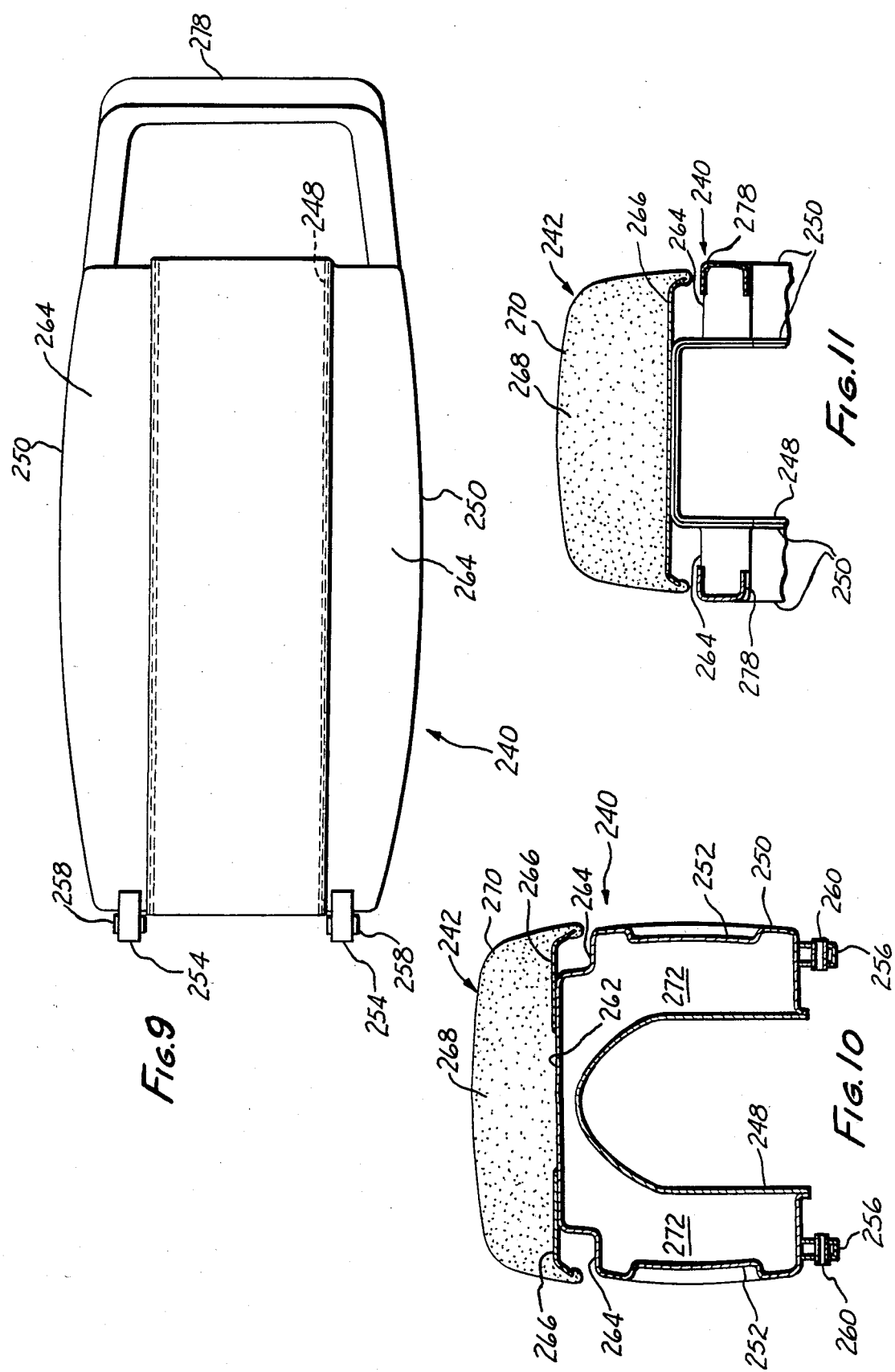

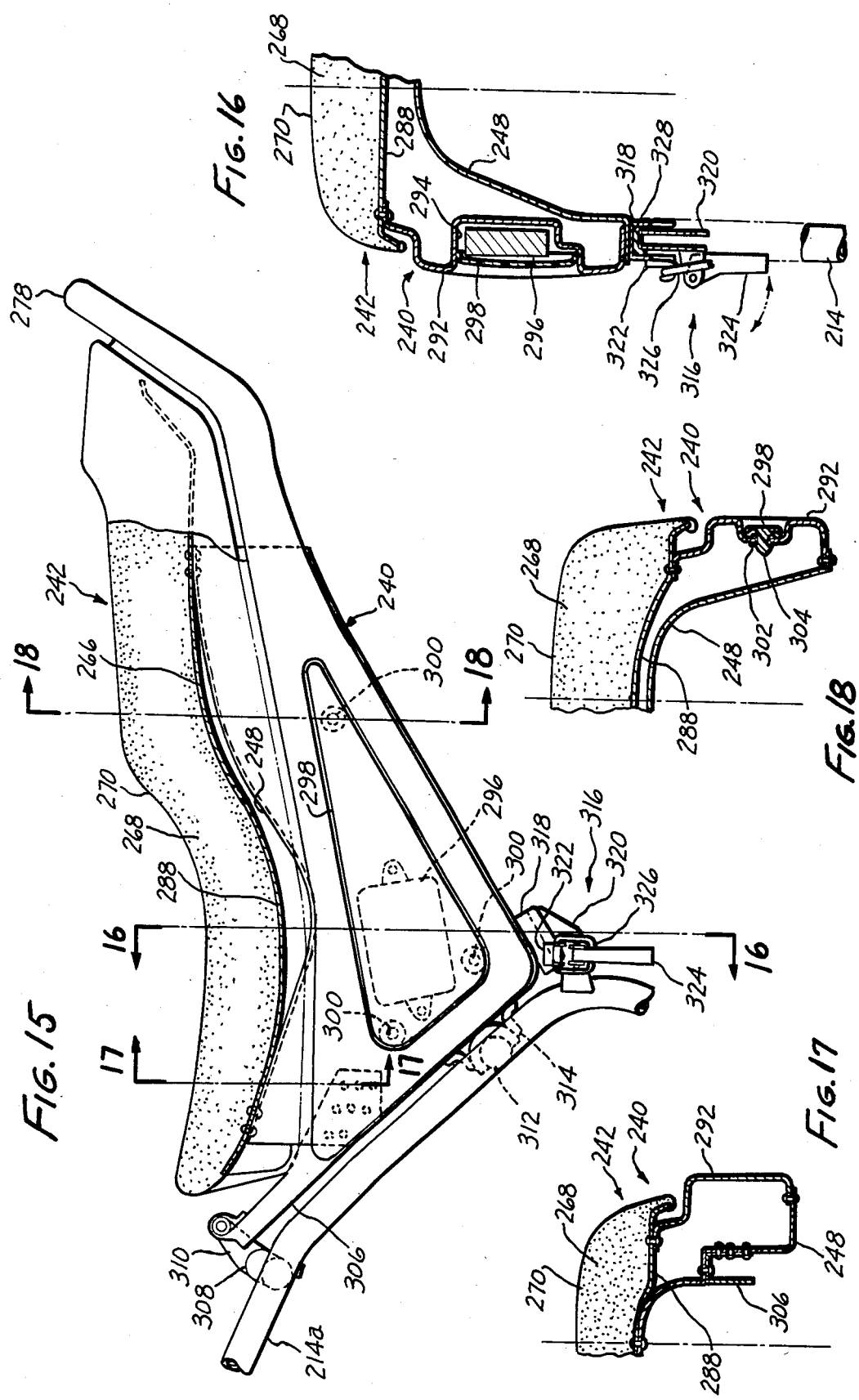

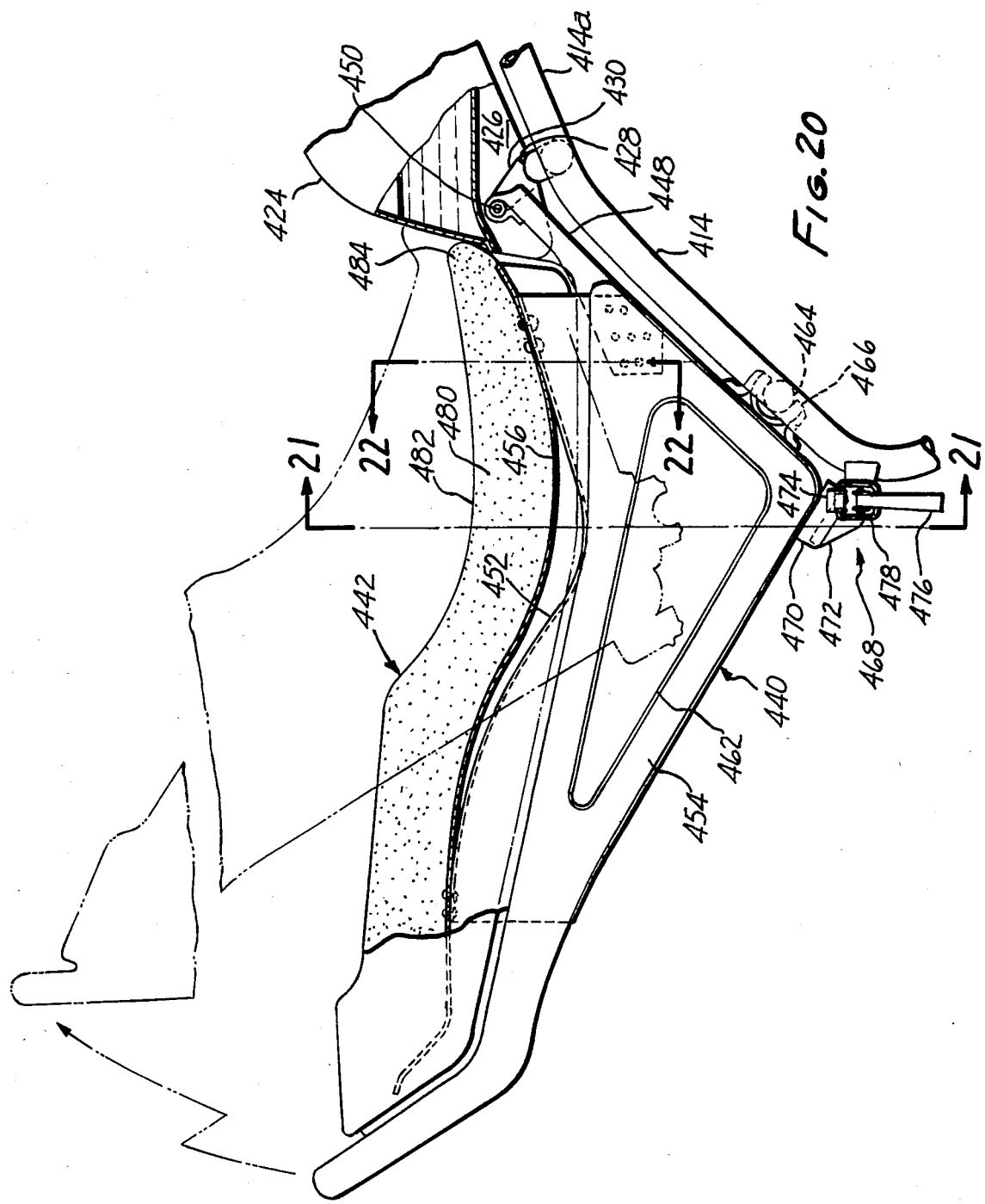

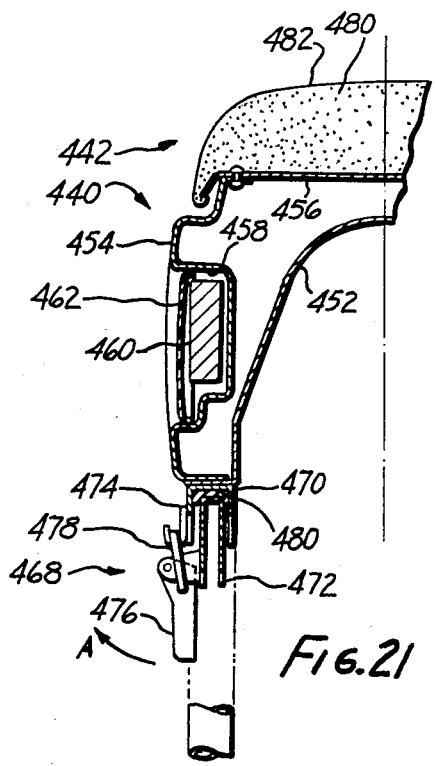
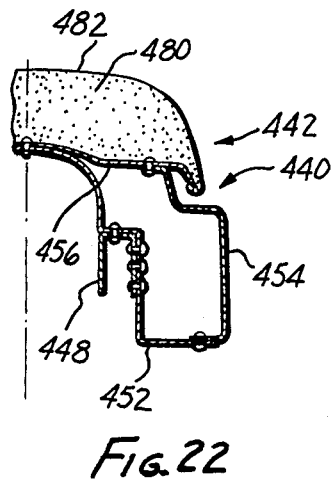
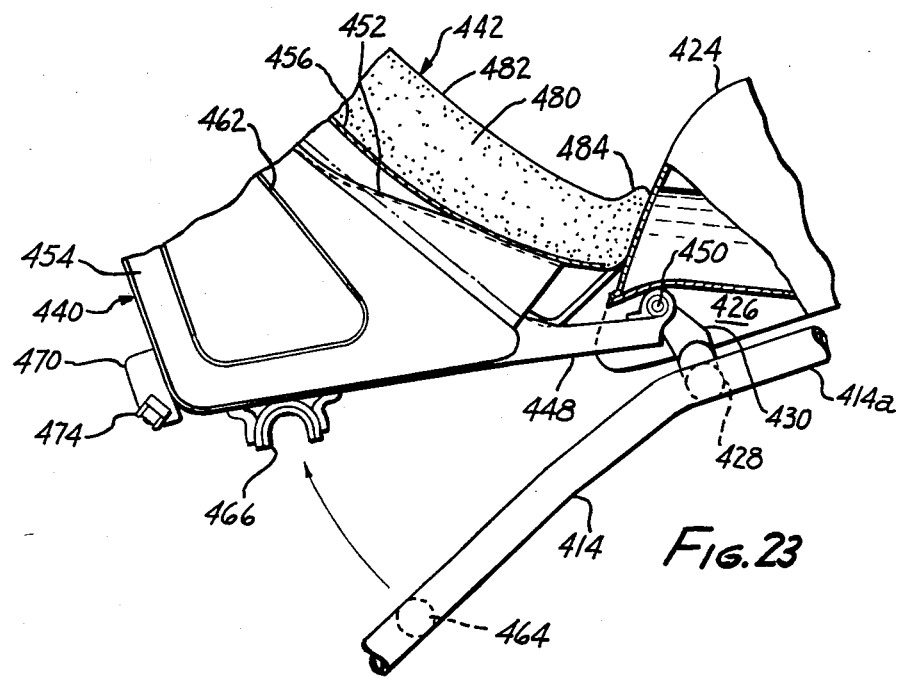

4,577,719

MOTORCYCLE FUEL SYSTEM WITH FLOW FROM A MAIN TANK THROUGH A LOWER AUXILIARY TANK TO ITS ENGINE

CROSS REFERENCE TO CO-PENDING PATENT APPLICATION

This is a division of applicant's co-pending U.S. patent application, Ser. No. 393,542, filed June 30, 1982, which in turn is a continuation of applicants' once co-pending U.S. patent application, Ser. No. 162,910, filed June 25, 1980 both now abandoned.

FIELD OF THE INVENTION

This invention relates to seat structures for motorcycles, especially for large-sized motorcycles (sometimes called "autocycles").

BACKGROUND OF THE INVENTION

In motorcycles equipped with an elongated seat, there has conventionally been proposed a seat hinging device, in which a seat has one side hinged so that it can be opened and closed widthwise of the motorcycle. In such a seat hinging device, however, the seat supporting frame and the rear fender are kept fixed to the body frame so that they cannot be moved. As a result, the conventional motorcycle seat hinging device has been inconvenient for the maintenance of parts which are disposed below the seat, and for access to items stored in this area.

Therefore, the present invention has been conceived to eliminate the aforementioned disadvantage of the prior art, and contemplates to provide a motorcycle seat structure with improved structure and utility.

BRIEF DESCRIPTION OF THE INVENTION

The present invention contemplates a seat supporting frame which is at least partially separable from the main frame of the motorcycle, whereby to give access to the inside of the frame beneath the seat.

According to preferred but optional features of the invention, the seat supporting frame is pivotally mounted to the main frame so it can be swung upwardly (preferably forwardly), or is attached to the main frame by separable fasteners for ready removal.

According to other optional features of the invention, the seat supporting frame also mounts the rear fender so it is tilted or removed along with the seat supporting frame. Also, the seat supporting frame can be made in a monocoque configuration, to provide increased rigidity, and if desired also to provide storage means, such as for a fuel tank.

The above and other features of this invention will be fully understood from the following detailed description and the accompanying drawings, in which:

BRIEF DESCRIPTION OF THE DRAWINGS

FIG. 1 is a side elevation showing a motorcycle to which an embodiment of the present invention is applied;

FIG. 2 is a side view, partly in cutaway cross-section showing a feature of the embodiment;

FIG. 3 is a perspective view showing the seat supporting frame to be used in the embodiment of FIG. 1;

FIG. 4 is a perspective view showing the body frame in the vicinity of the portion to which the seat supporting frame is attached;

FIGS. 5 and 6 are perspective views showing modifications of the seat supporting frames;

FIG. 8 is a side elevation of the seat supporting frame and the seat of this embodiment, the latter being shown in section;

FIG. 9 is a top plan view showing the seat supporting frame with the seat removed;

FIGS. 10 and 11 are sections taken along lines X—X, XI—XI, in FIG. 8, respectively;

FIG. 15 is a side elevation showing a portion of still another embodiment, partially in section;

FIGS. 16, 17 and 18 are sections taken along lines XVI—XVI, XVII—XVII, and XVIII—XVIII, respectively, in FIG. 15;

FIG. 20 is a side elevation of the seat and the seat supporting frame in FIG. 19, showing the former in section;

FIGS. 21 and 22 are sections taken along lines XXI—XXI and XXII—XXII in FIG. 20, respectively; and FIG. 23 is a fragmentary side elevation showing a portion of FIG. 19 in the opened condition.

DETAILED DESCRIPTION OF THE INVENTION

Figure 7:
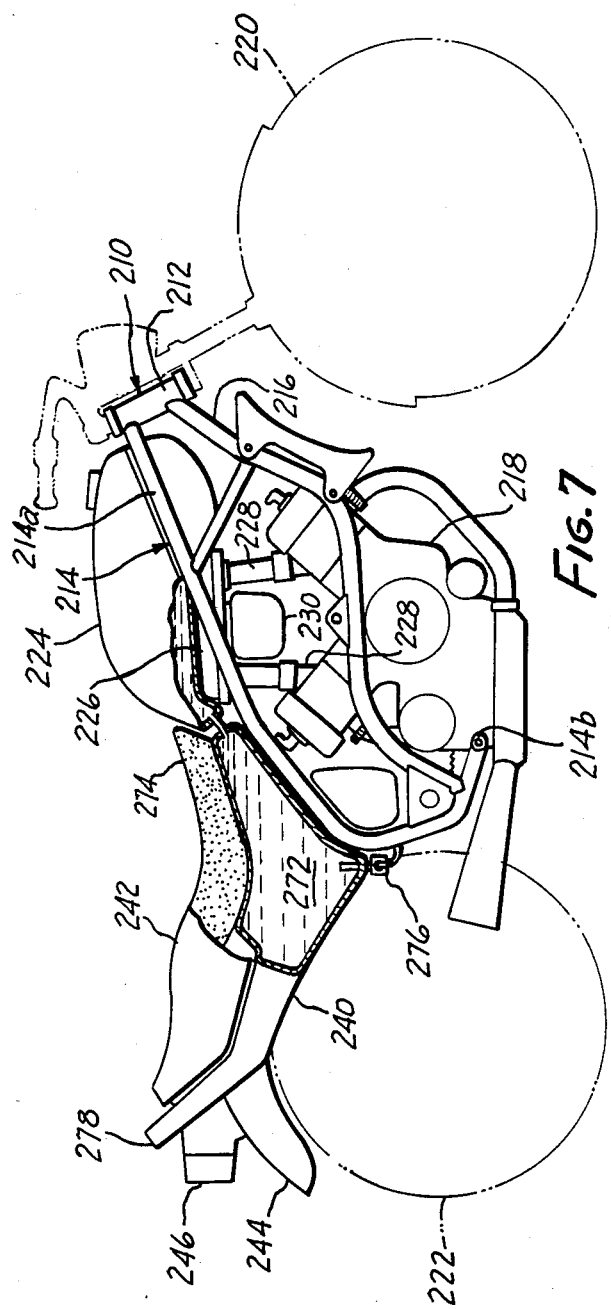
FIG. 7 is a side elevation showing another embodiment of the invention, partially in section.

In FIG. 1, the main frame 10 of a motorcycle has its front portion carrying a V-type engine 12 and its rear end suspending a rear wheel 14. The motorcycle of FIG. 1 is equipped with a cushion unit 38, as will be detailed later. As shown, in phantom lines in FIG. 1 an elongated seat 16, a seat supporting frame 18 supporting seat 16 and a rear fender 20 are connected into a continuous structure so that the assembly of seat 16, seat supporting frame 18, and rear fender 20 can be swung (tilted) about the front end of the supporting frame 18 into a raised position.

FIGS. 2, 3 and 4 are more detailed views showing portions of the construction. As shown in FIG. 2, seat 16 and seat supporting frame 18 are connected rotatably or hingedly to two main pipes 22 that constitute the body frame (although only one main pipe 22 is shown in FIG. 2). Seat supporting frame 18 is made of plates formed into the shape shown in FIG. 3. Angles 24 are disposed to protrude from the front end of seat supporting frame 18, and rear fender 20 is fixed to the rear end of seat supporting frame 18 by means of rivets 26. In an alternative arrangement, rear fender 20 may be molded integrally with seat supporting frame 18, or it may instead be fastened to frame 18 my means of bolts. As shown in FIG. 3, the curved portion 28 of seat supporting frame 18, which is formed in the vicinity of the angles 24, defines a space for accommodating a cushion unit 38, as will be described later.

Angles 24 protrude from the front end of the seat supporting frame 18 and are inserted into and supported by the insides 32 of two supports 30 (although only one support 30 is shown in FIG. 4), which are fixed to the main pipes 22 shown in FIG. 4, so that seat supporting frame 18 is prevented from moving under extension of the springs 42 which will be described later. The attaching structure of supports 30 to main pipes 22 is as follows. As shown in FIG. 4, a connecting plate 34 is fixed to bridge main pipes 22 which are juxtaposed with a preset spacing between them in the width-direction of the motorcycle. Supports 30 are attached to the upper side of connecting plate 34. A pin 36 is mounted in supports 30 in a manner to extend widthwise therethrough, so that it supports the upper end 40 of cushion seat 38.

As shown in FIG. 4, springs 42 have their ends 44 fixed on main pipes 22 by means of two retainers 46 (although only one retainer 46 is shown in FIG. 4). The other ends 48 of springs 42 constitute bent portions which are inserted, as shown in FIG. 2, into retaining holes 50 formed in seat supporting frame 18 so that springs 42 are attached to the seat supporting frame 18. As a result, seat 16 and the seat supporting frame 18 are in the its closed condition. However, when seat supporting frame 18 is brought to its open (tilted) condition (shown in phantom), springs 42 are moved under extension into the positions shown in the phantom lines in FIG. 2. As a result, front end 17 of seat 16 abuts against a fuel tank 103 at the initial stage of the swinging motion of seat supporting frame 18. However, the connection between seat supporting frame 18 and main pipes 22 is effected through springs 42, and these springs themselves are made movable so that the supporting frame 18 can be swung.

There are fixed to main pipes 22 a pair of brackets 54 (although only one bracket 54 is shown in FIGS. 2 and 4), each of which is formed with an L-shaped slot 52. Slidably fitted in slots 52 of brackets 54 are bent portions 58 which constitute ends of supporting rod 56. The other ends 60 of supporting rods 56 (as seen in FIG. 2) are hingedly connected to seat supporting frame 18. Each of supporting rods 56 has its bent portion 58 positioned at the end of the respective slot 52, as shown in FIG. 2, when seat supporting frame 18 is in its closed condition. When seat supporting frame 18 is brought to its open condition, on the other hand, the bent portion 58 slides in slot 52 until it is stopped at the other end 64 of the slot, as shown in FIG. 4. At this position, supporting rod 56 supports the seat supporting frame 18 in its open condition.

As shown in FIG. 2, moreover, there is fixed to portion 19 depending from seat supporting frame 18, a cap 66 in which a cylinder 68 is loosely fitted. A spring 70 and an elastic member 72 made of rubber or the like are interposed between cap 66 and cylinder 68, thereby to absorb the shocks to be exerted upon the seat supporting frame 18 when the latter is to be closed. To main pipe 22, on the other hand, there is fixed a receiver 74 in a manner to correspond to cap 66, as shown in FIGS. 2 and 4. Receiver 74 is formed with a cylinder 76, in which is supported the leading end 80 of a rod 78 fixed through cap 66. Receiver 74 is further formed with a latch 82 shown in phantom lines so that seat supporting frame 18 in its closed condition is retained and prevented by rod 78 from being opened erroneously during the running operation of the motorcycle. The release of latch 82 from its engagement is effected by operating a lever 83. As a result, seat supporting frame 18 in its closed position cannot be moved to its open position until after lever 83 is operated to release the engagement between rod 78 and latch 82.

As shown in FIG. 2, a supporting rod 84 has one end 86 hingedly connected to the outer circumference of cap 66. In case seat supporting frame 18 is in its closed position, the other end 88 of supporting rod 84 can be held in a holder 90 which is mounted in seat supporting frame 18, In case, however, seat supporting frame 18 is in its open position, the other end 88 of supporting rod 84 is inserted into cylinder 76 of the receiver 74 where as shown in phantom lines in FIG. 2, it abuts against the main pipe 22 thereby to support seat supporting frame 18 in its open position.

Incidentally, the members indicated by numerals 91 in FIG. 4 are rear arms which are attached through a connecting member 92 to a connecting member 94 supporting lower end 39 of cushion unit 38. More specifically, the head 93 of connecting member 92 is attached through a pin 96 to connecting member 94, which supports lower end 39 of cushion unit 38 through a pin 98 while being supported through a pin 100 upon a bracket 102 fixed to main pipes 22.

The operations of the embodiment having the construction thus far described according to the present invention will be described in the following.

First, when seat supporting frame 18 is in its closed position, seat 16 and seat supporting frame 18 are in the positions shown in solid lines in FIG. 2. Moreover, bent portion 58 of supporting rod 56 is held in end 62 of slot 52, and the other end 88 of supporting rod 84 is held by holder 90. Latch 82 is in its engaging condition, with rod 78 at the side of seat supporting frame 18.

Next, when seat supporting frame 18 is to be moved to its open position, latch 82 and rod 78 are disengaged so that the rear fender end of seat supporting frame 18 is raised to the position shown in the phantom lines in FIG. 2. In this condition, bent portion 58 of supporting rod 56 is slid in slot 52 to end 64, so that supporting rod 56 supports seat supporting frame 18. At the same time, the other end 88 of supporting rod 84 is removed from holder 90 and inserted into receiver 74, thereby to support seat supporting frame 18. In this instance, as shown in FIG. 1, seat 16, seat supporting frame 18 and rear fender 20 are raised at their rear portions to their tilted positions with respect to body frame 10. The parts below seat supporting frame 18, e.g., the rear cylinder of the V-type engine 12 can be accessed for maintenance with remarkable ease.

In the embodiment thus far described, front end 17 of seat 16 and the rear portion of fuel tank 103 are brought into abutment engagement at the initial stage of the opening operation of the seat 16. As a result, in order to facilitate the swinging operation of seat supporting frame 18, there are provided the springs 42 which have their center of rotation made movable. However, springs 42 can be replaced by normal hinges if the fuel tank 103 has its rear portion formed with such a relief as can admit the front end 17 of the seat 16.

FIGS. 5 and 6 are views showing a modification of the seat supporting frame 18. Specifically, seat supporting frame 18 may be constructed so that it can accommodate an oil tank 104, a tool box 106, a fuse box 108, an igniter unit 110, a glove box 112, and so on. Although, in the foregoing embodiment, the seat supporting frame 18 is made of plates, the present invention should not be limited to such construction but can be modified to be made of pipe frames, as shown in FIG. 6.

According to the structure thus far described, the seat supporting frame having the rear fender is hingedly connected, at its end opposite from the rear fender, to the body frame, which in turn has its front half carrying the engine and its rear end suspending the rear wheel so that the seat supporting frame and the seat supported thereby can be swung about the hinged portion of the seat supporting frame. As a result, the seat and its supporting frame including the rear fender are made movable together so that the parts below the seat supporting frame can be accessed for maintenance with ease, and stored items can easily be accessed.

While it is evident that in every embodiment of the invention there is a substantial benefit in the hinged mounting of the seat supporting frame to the main frame, this is not a necessary feature. It is, of course, advantageous, because while the seat and its supporting frame are being lifted, their weight is partially supported by the hinge itself, so the opening operation requires less physical exertion than if the seat and its supporting frame had to be bodily and completely removed. Also, the seat and seat supporting frame remain connected to the main frame so that closing them is simplier. Alignment of parts, bolt holes, and the like, is very much facilitated.

However, many of the advantages of this invention will still be enjoyed if the separability is complete, rather than partial (as in the hinged construction). Therefore, in all embodiments of the invention, it is contemplated that the hinge joint be demountable (separable) to enable the seat supporting frame and seat to be completely removed. Thus, all embodiments can be adapted to provide complete separability of the frames as well as partial separability, a non-demountable hinged construction being by definition a partial separability.

When the seat supporting frame is hingedly attached, and projects rearwardly from the main frame, then in operation, especially high speed operations, it is exposed to considerable bending moments. It must therefore be made very rigid. However, the running performance of the motorcycle is improved by keeping the weight low. Therefore, it is best practice to provide rigidity at the expense of as little additional weight as possible.

In order to attain this objective, the seat supporting frame is made to have a monocoque construction, with a closed sectional shape. The stress to be imparted to the seat supporting frame is received by a plate-formed member constituting the seat supporting frame. A main frame 210 (FIG. 7) is composed of a steering head pipe 212, a pair of upper tubes 214 and a pair of lower tubes 216 (only one of each of said tubes is shown in FIG. 7). Upper tubes 214 have their front halves constituting tank rails 214a and their rear halves bent downward into the shape of a hook. A V-type tandem engine 218 is supported on lower tubes 216 extending along both sides thereof and on the bent lower ends 214b of upper tubes 214. Front and rear wheels 220 and 222 are shown.

A fuel tank 224 has its front portion bulging downward at its rear side from between tank rails 214a (although only one is shown). Fuel tank 224 has a recess formed in its rear portion, in which is arranged a surge tank 226. Engine 218 has its intake pipes 228 protruding upward from the facing sides of the respective cylinders until their upper ends are connected with surge tank 226. A air cleaner 230 is interposed between intake pipes 228.

A seat supporting frame 240 has its side formed into an inverted elongated triangular shape. Seat supporting frame 240 is removably attached to upper tubes 214 such that its front lower face slopes and extends along upper tubes 214. An elongated seat 242 is placed upon seat supporting frame 240, and a rear fender 244 and a tail lamp 246 are attached to the rear portion of the same. In an alternative arrangement, rear fender 244 may be molded integrally with seat supporting frame 240.

Seat supporting frame 240 will be described in more detail in the following. As is apparent from FIGS. 8 and 10, seat supporting frame 240 is made to have a monocoque construction with a closed sectional shape. More specifically, seat supporting frame 240 is composed of an inner bottom plate 248 bent into an inverted U-shaped section and an outer plate 250 bent to cover the outer side of the inner bottom plate 248 and the two plates 248 and 250 have their peripheral edges welded to each other generally into a box shape. Outer plate 250 has its right and left sides formed with recesses 252 which are recessed into the closed section. The recesses 252 thus formed function to increase the rigidity of outer plate 250. A pair of right and left brackets 254 (as shown in FIGS. 8 and 9) are welded to the front crests of the inverse triangle formed by outer plate 250, whereas a pair of right and left brackets 256 are welded to the lower crests of the outer plate 250. Moreover, small pipes 258 and 260 are welded to brackets 254 and 256, respectively. Thus, seat supporting frame 240 is attached removably to upper tubes 214 of main frame 210, as has been described before, by means of bolts (not shown) which are inserted into small pipes 258 and 260.

As is apparent from FIG. 10, outer plate 250 has its upper side 262 forming a portion of the bottom plate of the aforementioned seat 242. Specifically, outer plate 250 has its right and left upper edges formed with stepped corners 264. There is welded to the upper side of outer plate 250 a pair of seat edge plates 266 which are formed to extend above the stepped corners 264 forward and backward of upper side 262. In other words, seat edge plates 266 have their center portions cut away to form the bottom plate of seat 242 together with upper side 262 and seat edge plates 266. The bottom plate thus formed is covered with a cover 270 through a cushion 268. Cover 270 has its peripheral edge retained on seat edge corners 266 in a manner to bite the peripheral edge of the aforementioned seat edge plates 266.

Inner bottom plate 248 and outer plate 250 are welded along the entirety of their peripheral edges, and the closed spaces defined by the two plates 248 and 250 are made to have communication with each other through the back of seat 242, as seen in FIGS. 8 and 10.

The closed space between inner bottom plate 248 and outer plate 250 is used as an auxiliary fuel tank 272. As shown in FIG. 7, more specifically, the closed space is made to communicate at its front end with the rear end of the aforementioned fuel tank 224 through a pipe 274. A fuel cock 276 is attached to the bottom of the closed space.

A handle 278 (FIGS. 7, 8 and 9) is welded to the rear end of seat supporting frame 240.

Figure 12:
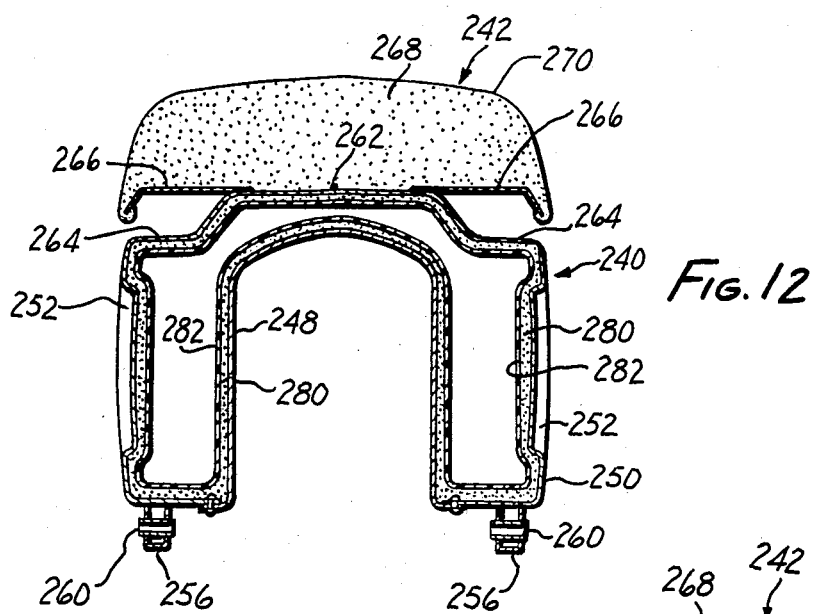
FIGS. 12, 13 and 14 are sectional views showing variations of this embodiment.

The closed space between inner bottom plate 248 and outer plate 250 of seat supporting frame 240 is shown used for an auxiliary fuel tank 272. However, a synthetic resin may be blown into the closed space thereby to mold another auxiliary fuel tank. FIG. 12 is a sectional view showing this embodiment using such a blow molding process. In this embodiment, an auxiliary fuel tank 282 is blow-molded of a synthetic resin inside an elastic material 280. As a result, tank 282 can be effectively protected from shocks by elastic material 280.

Figure 13:
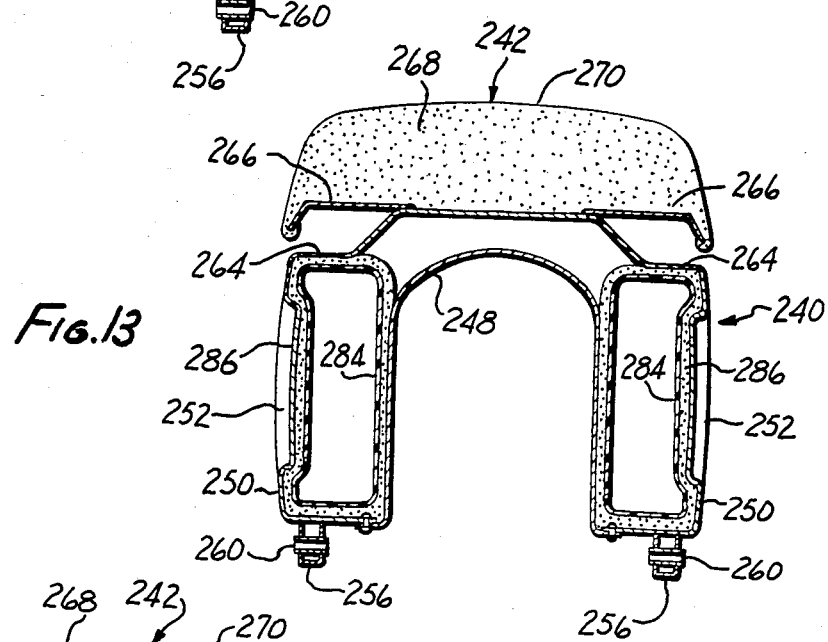

FIG. 13 shows an embodiment in which right and left auxiliary fuel tanks 284 are made independent of one another, and are accommodated in the aforementioned closed spaces inside elastic material 286. Similar parts to those in FIG. 10 are designated at the same numerals in FIGS. 12 and 13, and their repeated explanations are omitted here.

Although, in the foregoing embodiments of FIGS. 7-13, upper side 262 of outer plate 250 is used as the bottom plate of seat 242, another construction can be made, in which the outer plate is divided into two right and left planes such that they are connected to the single bottom plate.

Figure 14:
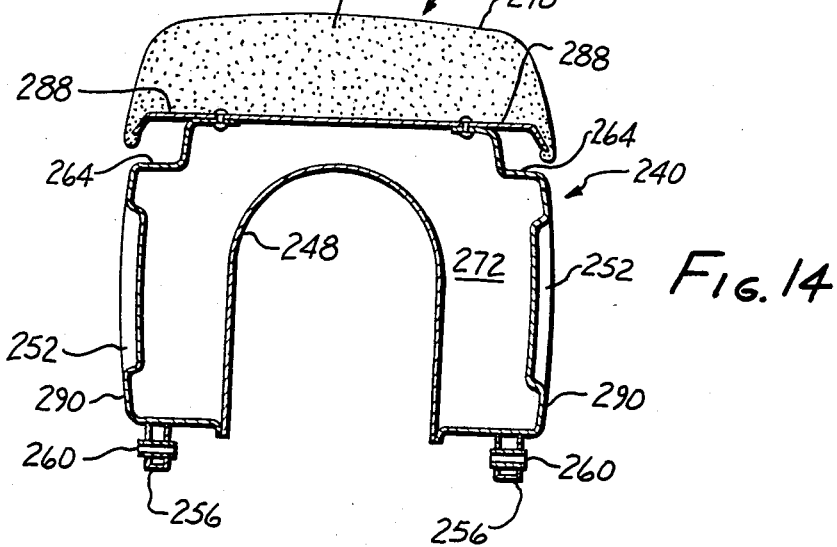

The embodiment thus constructed is shown in section in FIG. 14. In this figure, numeral 288 indicates the bottom plate of seat 242, which is made of a single plate-shaped member, whereas numerals 290 indicate a pair of right and left side plates. The closed sectional shape is formed in seat supporting frame 240 by connecting the upper edges of side plates 290 to bottom plate 288. In this particular embodiment, the pressing process to form side plates 290 is facilitated, with a resultant improvement in productivity. In this Figure, those parts corresponding to those in FIG. 10 are designated by the same numerals, and their repeated explanations are omitted here.

FIG. 15 is a side elevation showing another embodiment of the present invention, partially in section. This embodiment is equipped, similarly to the embodiment described with reference to FIG. 14, with a pair of side plates 292 (although only the left one is shown) which are connected to the bottom plate 288 of seat 242. Side plate 292 is formed with an accessory storage box 294 which is recessed into the closed section (as shown in FIG. 16). In accessory storage box 294, there is accommodated, for example, a CDI unit (which is the abbreviation of the "Capacitor Discharge Igniter") which is covered with a cover plate 298. Specifically, three small holes 300 (as better seen from FIG. 15) are formed in the accessory storage chamber 294. As shown in FIG. 18, annular elastic members 302 are fixed on the small holes 300, respectively, and protrusions 304 having their leading ends bulging are formed on the back of cover plate 298 in a manner to face the small holes 300. As a result, if protrusions 304 of the cover plate 298 are aligned with and forced into small holes 300, they extend through elastic members 302, while deforming the same, so that cover plate 298 is fixed under the condition shown in FIG. 18.

Incidentally, seat supporting frame 240 in this particular embodiment is attached to the main frame 210 so that it can be opened upward. As shown in FIGS. 15 and 17, more specifically, a stay 306 having a generally C-shaped section is fixed to the front end of inner bottom plate 248. Stay 306 has its front end connected pivotally to a bracket 310 which is welded to a cross pipe 308 extending between the aforementioned paired right and left tank rails 214a. Indicated at numerals 312 and 314 in FIG. 15 are a cross pipe, which is made to extend between upper tubes 214, and a receiving seat which is mounted on seat supporting frame 240. Receiving seat 314 is brought, under the condition having the seat supporting frame 240 placed for use, into abutment engagement with cross pipe 312, thereby to position seat supporting frame 240.

Incidentally, numeral 316 in FIGS. 15 and 16 indicates a lock mechanism. Lock mechanism 316 is constructed to include an upper bracket 318 of C-shaped section welded to the lower end of seat supporting frame 240, a lower bracket 320 welded to the aforementioned upper tubes 214 to enter the bifurcated space of upper bracket 318, a latch 322 welded to upper bracket 318, a lock lever 324 connected pivotally to lower bracket 320, and lock ring 326 attached to the lock lever 324 while engaging with the aforementioned latch 322. Thus, if lock lever 324 is turned to the position shown in FIGS. 15 and 16, lock ring 326 passes over the change point, i.e., the pivot of the lock lever 324 to bring upper and lower brackets 318 and 320 into their locked conditions so that seat supporting frame 240 is locked in its lowermost position. As shown in FIG. 16, upper bracket 318 is opposed by an elastic member 328, which is interposed between upper and lower brackets 318 and 320 when in the locking condition.

In FIGS. 15 to 18, the similar parts to those of the embodiments shown in FIGS. 7 to 14 are designated by the same numerals, and their repeated explanations are omitted here. In this embodiment, the seat supporting frame 240 which has a monocoque construction can intercept mud flung up by rear wheel 222. Because the seat supporting frame has a monocoque construction with a closed sectional shape such that it is made separate from the main frame and attached thereto in a manner to protrude backward therefrom, a sufficient rigidity can be imparted to the seat supporting frame to resist strong bending moments while still making the whole body as light as possible.

If, moreover, the inside of the seat supporting frame having the closed sectional shape is formed into the closed space, this space can be used, as it is, as a fluid reservoir such as a fuel tank. Then, if this fuel tank is used as an auxiliary, more fuel can be carried on the motorcycle.

Also, if the seat supporting frame constituting the closed sectional shape has a portion used commonly as the bottom plate of the seat, the seat itself can be placed at a lower position, while reducing its weight.

Furthermore, if the seat supporting frame is partially recessed into the inside of the closed section, the rigidity of the seat supporting frame is increased. In addition, if the recessed portion is used as an accessary storage box; the hollow portion in the seat supporting frame can be effectively utilized.

The embodiment of FIGS. 19-23 shows a means facilitating the pivoting action of the assembly of seat and seat supporting frame, which also simplifies their attachment to the main frame. Since the seat is usually made to have its rigid bottom plate extending to the front end thereof, when the seat is opened by turning up the rear portion of the seat, the seat bottom plate interferes with the fuel tank, thereby to make it difficult to widely open the seat fully upward. Therefore, it has been suggested that the seat be made slidable back and forth, or that the seat be shiftable backward by the use of a parallel link mechanism when it is opened upward. Also, the spring arrangement of FIG. 1 can be provided to avoid this disadvantage. However, there arises the further disadvantage that then the pivoting mechanism becomes complicated.

This embodiment provides a motorcycle seat which with its seat supporting frame can be widely opened upward without need for special mechanism.

Figure 19:
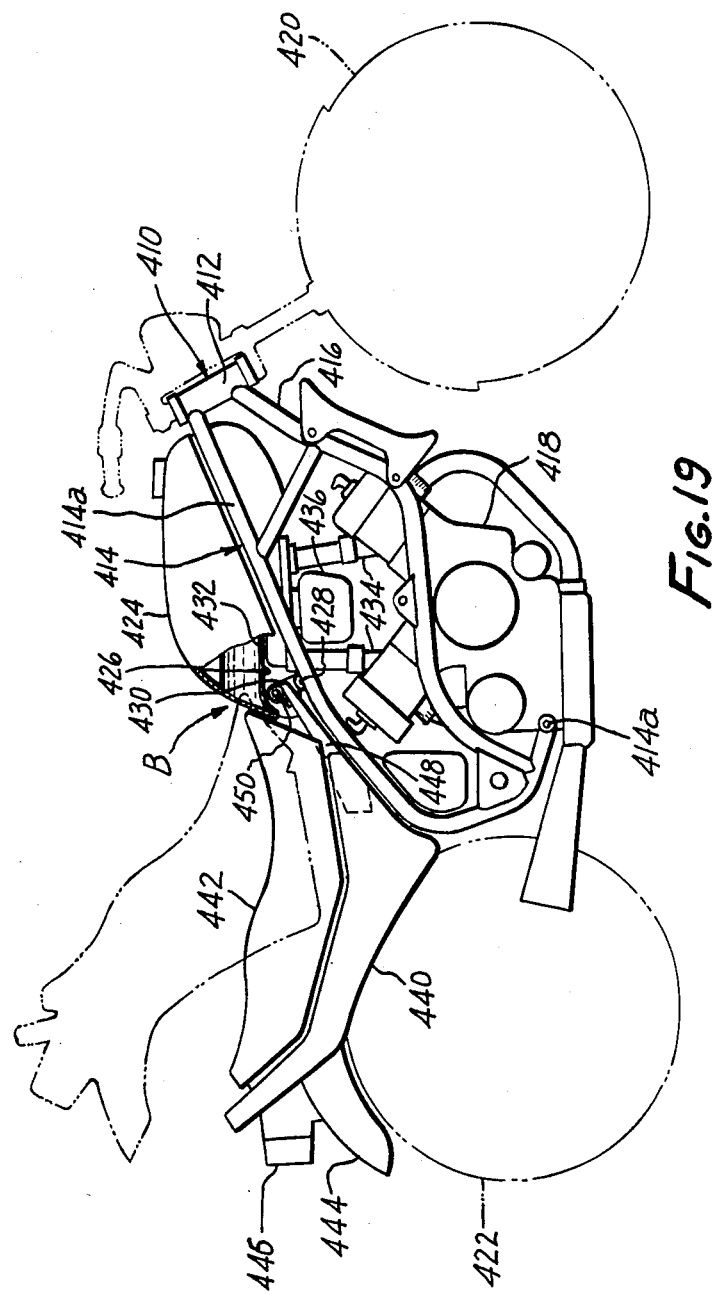
FIG. 19 is a side elevation showing, in partial section, a motorcycle with yet another embodiment of the invention.

A main frame 410 is shown in FIG. 19 which is constructed to include a steering head pipe 412, a pair of right and left upper tubes 414, and a pair of right and left lower tubes 416 (although only one each of said tubes is shown in FIG. 19). Upper tubes 414 have their front halves constituting tank rails 414a and their rear halves bent downwardly into the shape of a hook. A V-type tandem engine 418 is supported on the aforementioned lower tubes 416 extending along both sides of engine 418 and the lower ends 414b of the aforementioned upper tubes 414. Front and rear wheels, 420 and 422, respectively, are shown.

A fuel tank 424, has its front portion bulging downwardly from between the aforementioned paired tank rails 414a (although only one rail is shown), thereby to increase the capacity of fuel tank 424. Its rear portion is formed with a recess 426. Between the paired tank rails 414a, there is arranged an arch-shaped cross pipe 428 which is positioned at the back of recess 426. A bracket 430 is welded to cross pipe 428 so that a seat supporting frame 440 is pivotally supported, as will be described later. Within recess 426, there is disposed a surge tank 432 which is positioned in front of bracket 430. Engine 418 has its intake pipes 434 extending upwardly from the facing sides of its respective cylinders until their upper ends are connected with surge tank 432. An air cleaner 436 is interposed between intake pipes 434.

Seat supporting frame 440, which has been briefly mentioned above, has its side formed into an inverted triangle extending longitudinally. An elongated seat 442 is placed upon seat supporting frame 440. A rear fender 444 and a tail lamp 446 are attached to the rear portion of the seat supporting frame 440. There are fixed to seat supporting frame 440 a pair of right and left stays 448, through which seat supporting frame 440 is pivotally connected to bracket 430. More specifically, the interconnected seat supporting frame 440 and seat 442 can swing (tilt) upward, as shown in phantom lines in FIG. 19, substantially in an elongated vertical plane about pivot 450 of bracket 430.

FIG. 20 is a side elevation of seat 442 and seat supporting frame 440, showing the former in section. Seat supporting frame 440 is made, as is apparent from FIGS. 21 and 22, to have a monocoque construction having a closed sectional shape. More specifically, seat supporting frame 440 is constructed to include an inner bottom plate 452 having its section bent into a shape of inverted letter "U" and a pair of right and left side plates 454 (although only one of these plates is shown) which cover both sides of inner bottom plate 452. Both side plates 454 have their upper edges fixed to the bottom plate 456 of seat 442. As a result, bottom plate 456 of seat 442 is used to act commonly as the member for forming the closed sectional shape of the seat supporting frame 440. Side plates 454 are formed, as shown in FIG. 21, with an accessary storage box 458 which is recessed into the closed section. For instance, there is accommodated in the storage box 458 a CDI unit (which is the abbreviation of the Capacitor Discharge Igniter) which is covered with a cover plate 462. To the front end portion of the inner bottom plate 452, there is fixed by means of rivets the aforementioned stays 448, which in turn are pivotally connected at their front ends to bracket 430 by means of pivot 450.

Turning now to FIGS. 20 and 23, numeral 464 indicates a cross pipe, which is arranged to extend between the paired upper tubes 414. A receiving seat 466 is mounted on seat supporting frame 440. In the position shown in solid lines in FIG. 20 with seat supporting frame 440 being in its lower position, receiving seat 446 abuts against cross pipe 464, thereby to position seat supporting frame 440. A lock mechanism 468 (see FIGS. 20 and 21) is used to fix seat supporting frame 440 in its lowermost position. Lock mechanism 468 is constructed to include an upper bracket 470 of C-shaped section welded to the lower end of seat supporting frame 440, a lower bracket 472 welded to the aforementioned upper tubes 414 in a manner to enter the space in the C-shaped section of the upper bracket 470, a latch 474 welded to the upper bracket 470, a lock lever 476 pivotally connected to lower bracket 472, and a lock ring 478 attached to lock lever 476 while engaging with the aforementioned latch 474. An elastic member 480 is interposed between upper and lower brackets 470 and 472.

Seat 442 is constructed to include the aforementioned bottom plate 456, a cushion 480 placed on bottom plate 456 and a cover 482 covering cushion 480. Cover 482 has its peripheral edge retained to bite the peripheral edge of bottom plate 456. Bottom plate 456 has its front end suitably spaced from the rear end of the aforementioned fuel tank 424 so that it does not interfere with fuel tank 424 even when seat supporting frame 440 is opened upwardly. At front end 484 of seat 442, cushion 480 and cover 482 are made to extend forwardly beyond the front end of bottom plate 456 so that cover 482 abuts against fuel tank 424. Thus, front end 484 of seat 442 is made elastically deformable by cushion 480 and cover 482.

Now, if the aforementioned lock lever 476 is turned in the direction of arrow A, as viewed in FIG. 21, lock mechanism 468 is released from its locked condition so that seat supporting frame 440 can be opened upwardly together with seat 442. At this time, front end 484 of seat 442 interferes with fuel tank 424 at its portion shown in arrow B in FIG. 19. However, since front end 484 is composed of cushion 480 and cover 482 which are elastically deformable, and since the leading end of bottom plate 456 (which can not be deformed) is spaced apart from the rear end of fuel tank 424, front end 484 can easily be deformed in the manner shown in FIG. 23. As a result, seat 442 and seat supporting frame 440 can be fully opened upwardly.

In this embodiment as thus far described, front end 484 of the seat interferes with fuel tank 424 when seat supporting frame 440 is tilted upwardly, so that it is elastically deformed. However, the present invention can be modified into another construction, in which the front end of the seat interferes with the fuel tank so that it is elastically deformed, under the inverse condition when the seat is lowered and closed, and the front end restores its original shape when the seat is tilted to open the seat supporting frame 440.

According to the foregoing embodiment, moreover, although the elastically deformable front end 484 is composed of cushion 480 and cover 482, the present invention can be further modified such that the front end of the bottom plate is made of an elastically deformable material, thereby to constitute the front end together with cushion 480 and cover 482.

As has been described hereinbefore, according to the embodiment of FIGS. 19–23, the seat supporting frame is pivotally supported in the vicinity of the front end thereof in a manner to swing upward substantially in an elongated vertical plane, and the seat front end is made elastically deformable. As a result, when the seat is opened (or closed), the front end is brought into abutment against the fuel tank so that it is deformed, and when the seat is closed (or opened), the front end restores to its original shape. Thus, the seat can be widely opened upward without any use of a special mechanism.

This invention is not to be limited by the embodiments shown in the drawings and described in the description which are given by way of example and not of limitation, but only in accordance with the scope of the appended claims.

We claim:

1. In combination with a motorcycle which has a main frame and an engine mounted to said frame, a fuel supply system for said engine comprising: an upper main tank having a filler neck for filling the same, and a lower outlet port; a separate auxiliary tank disposed at a lower elevation than said main tank, said auxiliary tank having an upper inlet port and a lower outlet port, both of said tanks being mounted to said motorcycle; first conduit means connecting the outlet port of said main tank to the inlet port of said auxiliary tank; and a second conduit means connecting the outlet port of said auxiliary tank to said engine, whereby fuel flow is from said main tank through said auxiliary tank to said engine.

2. Apparatus according to claim 1 in which a seat supporting frame is pivotally mounted to said main frame, and in which said auxiliary tank is mounted to said seat supporting frame.

3. Apparatus according to claim 2 in which said first conduit is flexible, whereby to bend when the seat supporting frame is pivotally moved.

* * * * *